US012129999B1

(12) United States Patent
Wang

(10) Patent No.: US 12,129,999 B1
(45) Date of Patent: Oct. 29, 2024

(54) DIRECT MOUNT FIRE RATED RECESSED LUMINAIRE

(71) Applicant: Tiejun Wang, Lin'an (CN)

(72) Inventor: Tiejun Wang, Lin'an (CN)

( * ) Notice: Subject to any disclaimer, the term of this patent is extended or adjusted under 35 U.S.C. 154(b) by 0 days.

(21) Appl. No.: 18/514,596

(22) Filed: Nov. 20, 2023

(51) Int. Cl.

| | |
|---|---|
| ***F21V 25/12*** | (2006.01) |
| ***F21V 7/00*** | (2006.01) |
| ***F21V 17/16*** | (2006.01) |
| ***F21V 23/00*** | (2015.01) |
| ***F21Y 115/10*** | (2016.01) |

(52) U.S. Cl.
CPC ................ *F21V 25/12* (2013.01); *F21V 7/00* (2013.01); *F21V 17/164* (2013.01); *F21V 23/003* (2013.01); *F21Y 2115/10* (2016.08)

(58) Field of Classification Search
CPC ...... F21V 25/12; F21V 23/003; F21V 17/164; F21V 7/00
See application file for complete search history.

(56) References Cited

U.S. PATENT DOCUMENTS

| | | | | |
|---|---|---|---|---|
| 4,754,377 A * | 6/1988 | Wenman | F21V 29/15 362/373 |
| 7,651,238 B2 * | 1/2010 | O'Brien | F21V 29/15 362/147 |
| 8,657,473 B2 * | 2/2014 | Esmailzadeh | F21V 15/01 362/365 |
| 8,926,133 B2 * | 1/2015 | Booth | F21S 8/026 362/249.02 |
| 9,709,257 B2 * | 7/2017 | Wu | F21S 8/04 |
| 9,797,563 B2 * | 10/2017 | Luo | F21V 25/12 |
| 10,184,248 B2 * | 1/2019 | Morgan, III | E04B 9/0435 |
| 10,551,044 B2 * | 2/2020 | Peng | F21V 17/18 |
| 11,435,064 B1 * | 9/2022 | Danesh | F21V 21/04 |
| 2008/0170404 A1 * | 7/2008 | Steer | F21S 8/02 362/365 |
| 2017/0167672 A1 * | 6/2017 | Stauner | F21V 21/04 |

* cited by examiner

*Primary Examiner* — Arman B Fallahkhair
(74) *Attorney, Agent, or Firm* — Daniel M. Cohn; Howard M. Cohn

(57) ABSTRACT

A fire resistant recessed luminaire constructed of an outer steel enclosure having a cylindrical shape that is open at one end and provided with a closed base at the opposite end. The open end has a shoulder extending outward from a perimeter of the outer steel enclosure. A fire insulation layer is disposed within and against the outer steel enclosure so as to conform to an inner shape of the outer steel enclosure. An inner steel enclosure is disposed within the fire insulation layer so as to force the insulation layer against the closed base and inner side wall of the outer steel enclosure. A light diffuser has a reflector trim extending outward from a second perimeter about an open end disposed in the inner steel enclosure so as to rest against a rim extending outward from an open end of the inner steel enclosure.

15 Claims, 4 Drawing Sheets

DIRECT MOUNT FIRE RATED RECESSED LUMINAIRE

TECHNICAL FIELD

Embodiments of the technology relate generally to fire resistant recesses luminaire and more particularly to a fire resistant recesses luminaire of compact design suitable for mounting in a ceiling.

BACKGROUND

A recessed luminaire is a luminaire that can be embedded in the ceiling and used to provide a light source to the indoor environment. Generally, the recessed lamp includes a lamp housing, a base, and a light source lamp cup, wherein the base is disposed in an inner space of the lamp housing, and the base is adapted to be connected to one An external power source, the light source cup is disposed on the base and is held in an inner space of the lamp housing, and the light source cup is electrically connected to the base, wherein There is a gap between the base and the inner wall of the lamp envelope and between the light source cup and the inner wall of the lamp envelope. In addition, the top of the lamp housing is provided with heat dissipation channels, and the heat dissipation channels of the lamp housing and the lamp housing communicate with each other to allow air to flow in the inner space of the lamp housing, thereby ensuring the embedded lamp thermal performance. However, the ceiling generally requires a wooden keel (wood beam or wood frame, etc.) to be suspended in the room, and the embedded luminaire is placed in the indoor environment of the room in such a manner as to be embedded in the mounting hole of the ceiling. The gap of the embedded luminaire and the heat dissipation channel may cause the upper space of the ceiling and the lower space to communicate while ensuring the heat dissipation capability of the embedded luminaire. If a fire occurs in the lower space of the ceiling, the fire generated by the fire will quickly spread to the upper space of the ceiling through the slit of the recessed luminaire and the heat dissipation passage, which easily causes the wood keel to burn, and once this When the situation arises, it will inevitably lead to the rapid spread of the fire. Therefore, how to improve the fireproof performance of the embedded luminaire while ensuring the heat dissipation capability of the embedded luminaire is a technical problem that the industry has long paid attention to and is committed to solve.

In a multi-family building where people may be living or inhabiting above, the ceiling below must be fire rated. Any recessed luminaire shall be installed such that the required fire resistance of ceiling will not be reduced. Neither heat nor flames will travel above ceiling through the recessed luminaire cutout. The traditional solutions are to provide an additional enclosure made of fire rated gypsum board to cover the luminaire completely. This solution requires extra ceiling space and is costly. Another solution is to provide separated recessed luminaire housing pre-installed above the ceiling which is made of steel and filled with thermal insulation.

SUMMARY OF THE INVENTION

In accordance with the present invention, an upgrade, low cost and easy installation solution comprises a direct mount fire-resistant luminaire consisting of an integrated double wall of steel with non-combustible insulation between the walls.

In accordance with the present invention, a fire resistant recessed luminaire is constructed of an outer steel enclosure having a cylindrical shape that is open at one end and provided with a closed base at the opposite end. The open end has a shoulder extending outward from a perimeter of the outer steel enclosure. A fire insulation layer is disposed within and against the outer steel enclosure so as to conform to an inner shape of the outer steel enclosure. An inner steel enclosure is disposed within the fire insulation layer so as to force the insulation layer against the closed base and inner side wall of the outer steel enclosure. A light diffuser has a reflector trim extending outward from a second perimeter about an open end disposed in the inner steel enclosure so as to rest against a rim extending outward from an open end of the inner steel enclosure.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
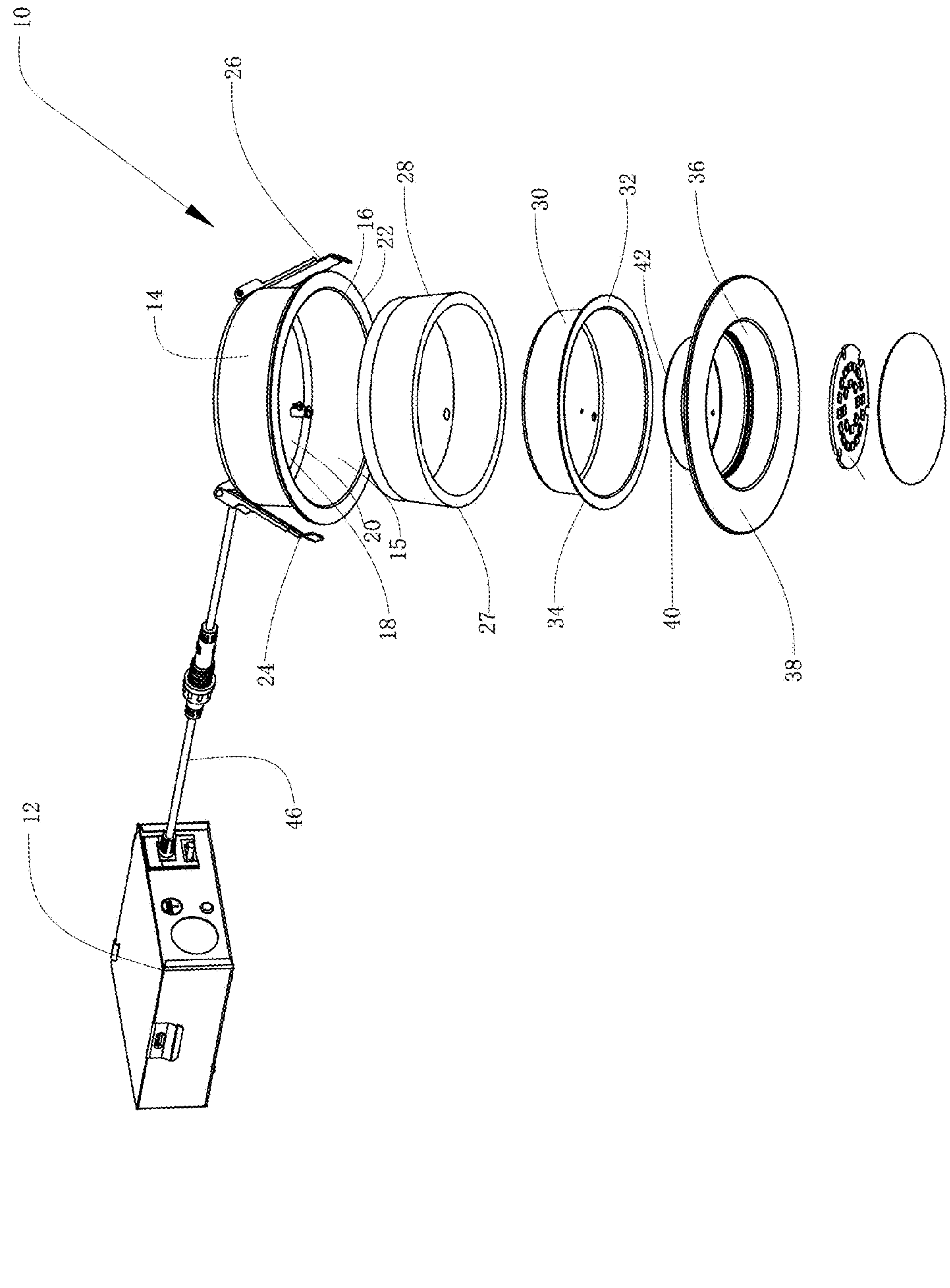

In some cases, similar elements may be referred to by similar numbers in various figures (FIGS.) of the drawing, in which case typically the last two significant digits may be the same, the most significant digit being the number of the drawing figure (FIG.). Furthermore, for clarity, some reference numbers may be omitted in certain drawings.

FIG. 1 is an exploded bottom view of a fire resistant recessed luminaire and junction box with an LED driver, according to the present invention.

Figure 2:
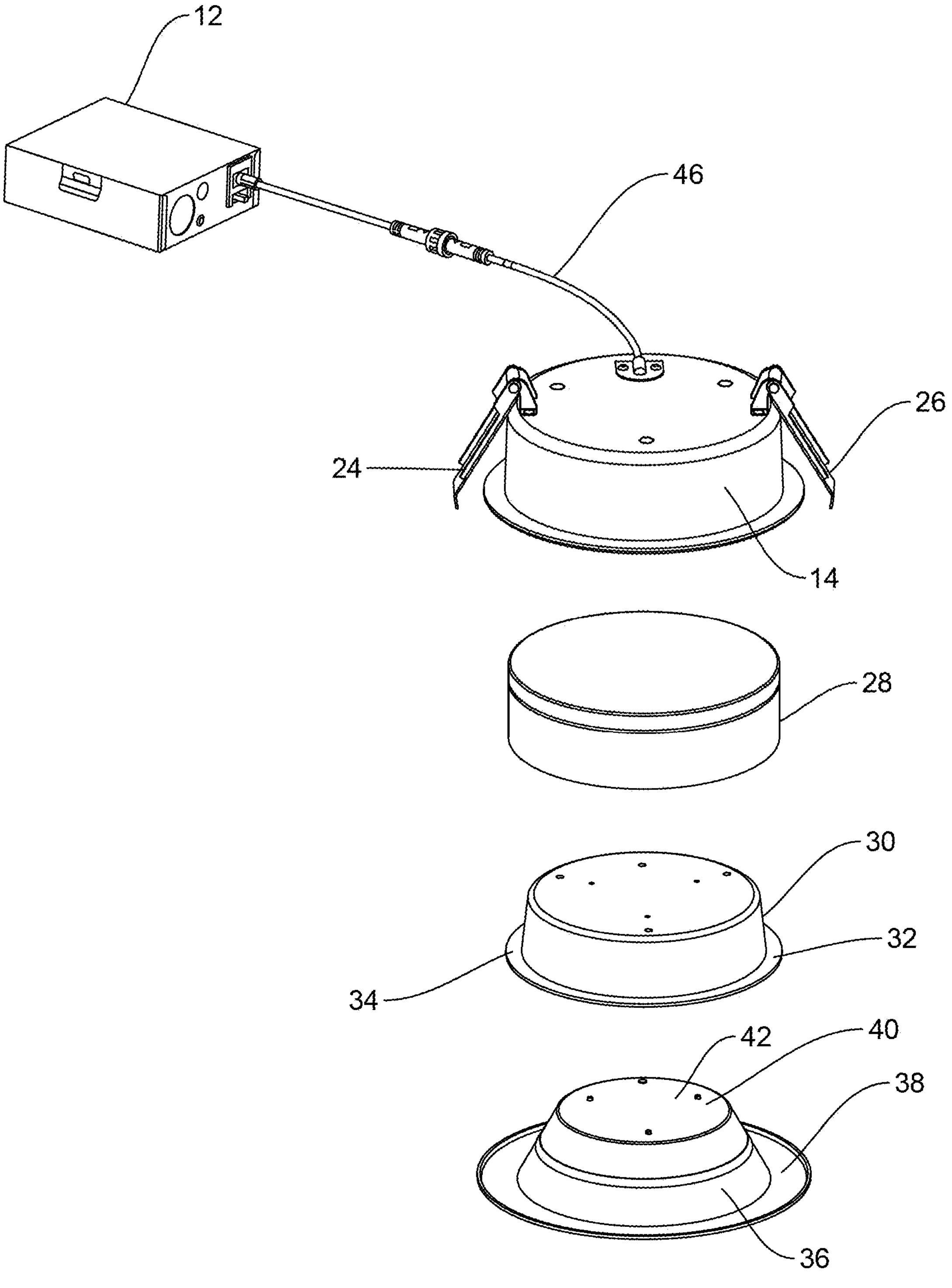

FIG. 2 is an exploded top view of a fire resistant recessed luminaire and junction box with an LED driver, according to the present invention.

Figure 3:
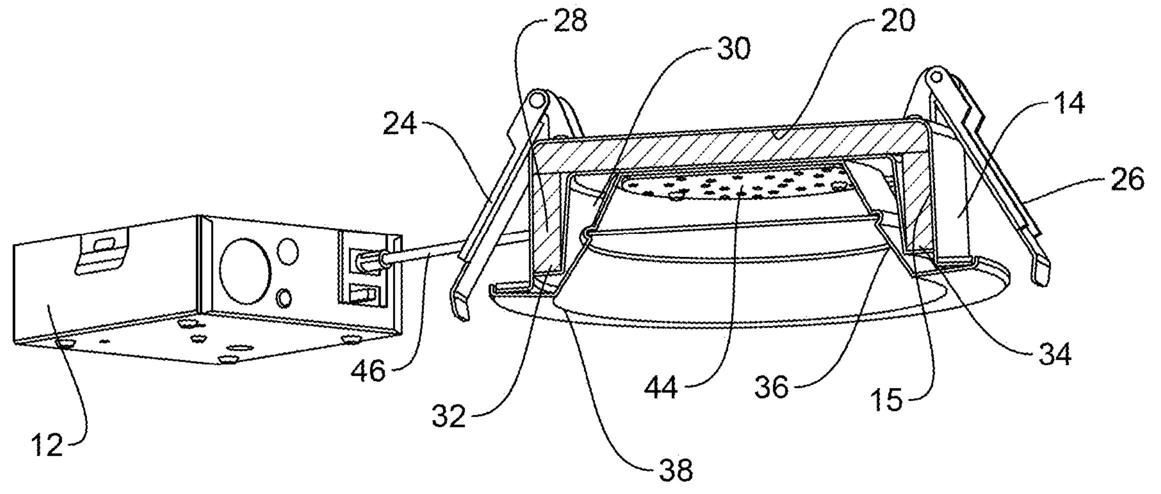

FIG. 3 is a side, cross sectional view of a fire resistant recessed luminaire and junction box with an LED driver, according to the present invention.

Figure 4:
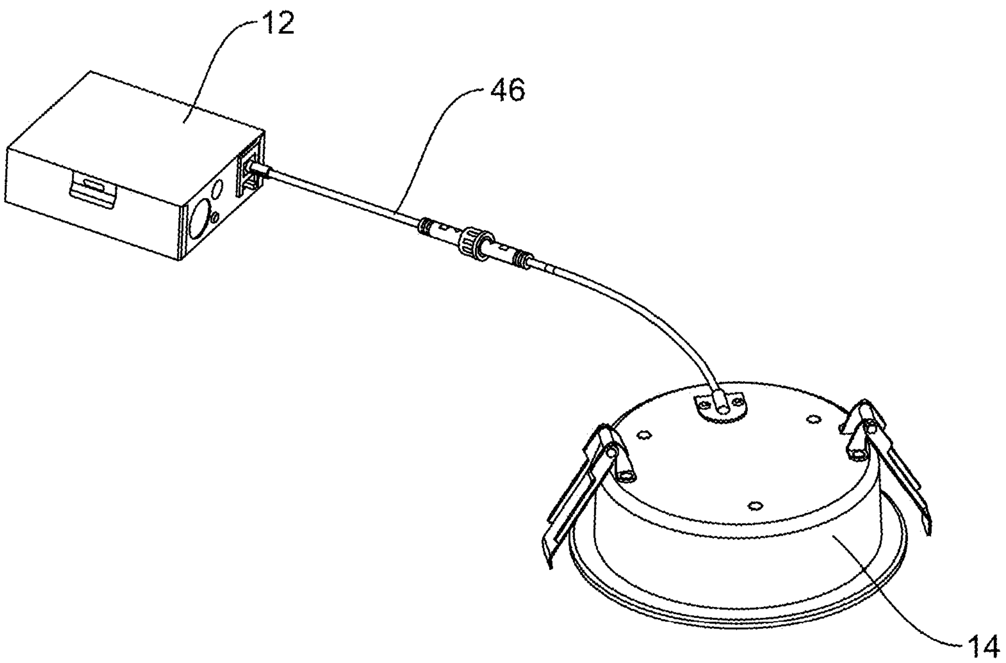

FIG. 4 is a top view of the an assembled fire resistant recessed luminaire and junction box with an LED driver, according to the present invention.

Figure 5:
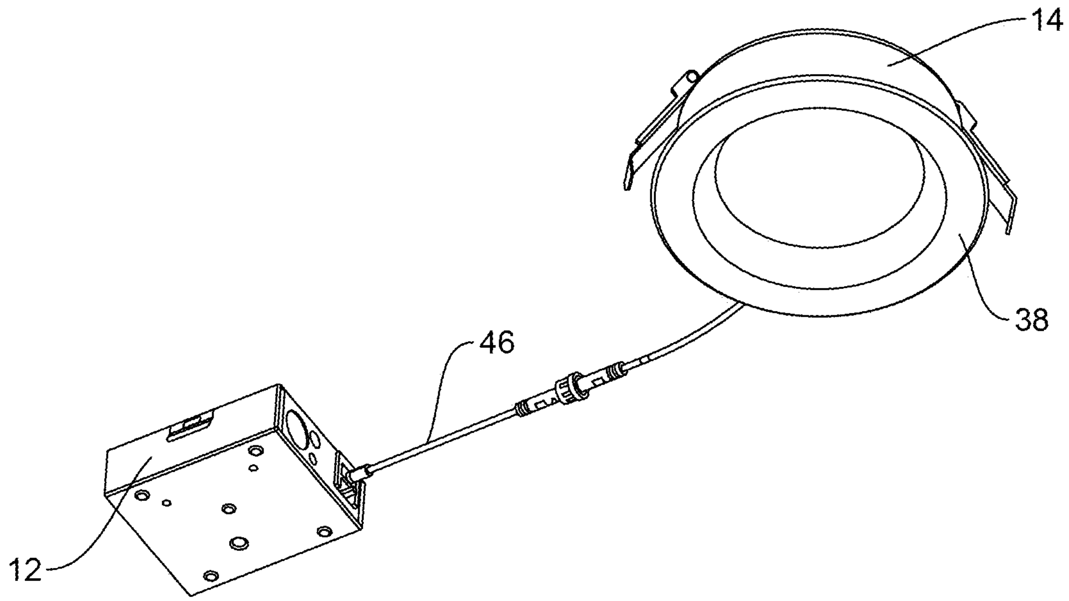

FIG. 5 is a bottom view of an assembled fire resistant recessed luminaire and junction box with an LED driver, according to the present invention.

DETAILED DESCRIPTION OF THE PREFERRED EMBODIMENT

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Referring to FIG. 1, there is illustrated an exploded view of fire-resistant recessed luminaire 10 and a junction box 12 with an LED driver. The fire-resistant recessed luminaire 10 includes an outer steel enclosure 14 having a cylindrical shape that is open at one end 16 and provided with a closed base 18.

The open end 16 has a shoulder 22 extending outward from the perimeter of the outer steel enclosure 14. It's also within the terms of the invention to provide a gasket below a reflector trim on the bottom, outward facing side the shoulder 22.

A pair of mounting clips 24 and 26 are attached to the backside of the steel enclosure 14 as shown in FIG. 1. Referring to FIG. 3, there is illustrated a cross sectional view of the luminaire 10 shown in FIG. 1. A fire insulation layer 28 constructed of a fire rated material is disposed within and against the outer steel enclosure 14 so as to conform to the inner shape of the outer steel enclosure 14. An inner steel enclosure 30 is disposed within the outer steel enclosure 14 and forces the insulation layer 28 against the upper surface 20 and inner side wall 15 of the outer steel enclosure 14. The inner steel enclosure 30 has a rim 32 having an upper surface 34 which is seated against the lower end 27 of the insulation layer 28.

A light diffuser 36 having a reflector trim 38 is disposed in the inner steel enclosure 30 so as to rest against the inner side 32 of the steel enclosure 30. The light diffuser 36 has a frustro-concial shape extending upward from a reflector trim 38.

A junction box 12 is connected by a power cord 46 through the outer steel enclosure 14 to the LED board 44.

The fire-resistant recessed luminaire 10 is assembled by inserting the cylindrical insulation layer 28 into the outer steel enclosure 14 so as to force the insulation layer 28 against the upper surface 20 and inner side wall 15 of the outer steel enclosure 14. The inner steel enclosure 30 is disposed within the insulation layer 28 so an upper surface 34 of the rim 32 is seated against the lower end 27 of the insulation layer 28.

A light diffuser 36 having a reflector trim 38 is disposed in the inner steel enclosure 30 so as to rest against the inner side 32 of the reflector trim 38 of the inner steel enclosure 30. An LED board 44 mounted to the inner side of upper surface 42 of the light diffuser. The light diffuser 36 has a frustro-concial shape extending upward from a reflector trim 38. Next, the mounting clips 24 and 26 are locked against the outer steel enclosure 14. The light diffuser and the junction box 12 with an LED driver is attached by wire 46 to the LED board 44.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A fire resistant recessed luminaire, comprising:

- the fire resistant recessed luminaire including an outer steel enclosure having a cylindrical shape that is open at one end and provided with a closed base at the opposite end;
- the open end having a shoulder extending outward from a perimeter of the outer steel enclosure;
- a fire insulation layer disposed within and against the outer steel enclosure so as to conform to an inner shape of the outer steel enclosure;
- an inner steel enclosure is disposed within the fire insulation layer so as to force the insulation layer against the closed base and inner side wall of the outer steel enclosure;
- a light diffuser having a reflector trim extending outward from a second perimeter about an open end disposed in the inner steel enclosure so as to rest against a rim extending outward from an open end of the inner steel enclosure.

2. The of claim 1 wherein the inner steel enclosure has a rim having an upper surface which is seated against a lower end of the insulation layer.

3. The fire resistant recessed luminaire of claim 2 including the inner steel enclosure disposed within the insulation layer so an upper surface of the rim is seated against the lower end of the insulation layer.

4. The fire resistant recessed luminaire of claim 3 including the light diffuser having a reflector trim disposed in the inner steel enclosure so as to rest against the outer facing side of the reflector trim of the inner steel enclosure.

5. The fire resistant recessed luminaire of claim 4 including the LED board mounted to the inner side of upper surface of the light diffuser.

6. The fire resistant recessed luminaire of claim 5 wherein the light diffuser has a frustro-conical shape extending upward from a reflector trim.

7. The fire resistant recessed luminaire of claim 6 wherein a pair of mounting clips and are attached to a backside of the steel enclosure.

8. The fire resistant recessed luminaire of claim 7 wherein the mounting clips and are locked against the light diffuser.

9. The fire resistant recessed luminaire of claim 5 wherein an LED driver is attached by a wire to the LED board.

10. The fire resistant recessed luminaire of claim 1 wherein the light diffuser has a frustro-conical shape extending upward from the reflector trim.

11. The fire resistant recessed luminaire of claim 10 wherein the junction box is connected by a power cord through the outer steel enclosure to an LED board.

12. The fire resistant recessed luminaire of claim 11 including the cylindrical insulation layer inserted into the outer steel enclosure so as to force the insulation layer against the upper surface and the inner side wall of the outer steel enclosure.

13. The fire resistant recessed luminaire of claim 1 including a junction box with an LED driver connected to the fire resistant recessed luminaire.

14. The fire resistant recessed luminaire of claim 1 wherein a gasket is provided below a reflector trim on a bottom, outward facing side of the rim extending outward from an open end of the inner steel enclosure.

15. The fire resistant recessed luminaire of claim 1 wherein a fire insulation layer is constructed of a fire rated material.

* * * * *